(12) United States Patent
Haim et al.

(10) Patent No.: US 7,684,371 B2
(45) Date of Patent: *Mar. 23, 2010

(54) METHOD AND APPARATUS FOR BLIND CODE DETECTION

(75) Inventors: John W. Haim, Baldwin, NY (US);
Hyun-Seok Oh, Ridgefield, NJ (US);
Younglok Kim, Fort Lee, NJ (US);
Ariela Ziera, Huntington, NY (US);
Robert A. DiFazio, Greenlawn, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/426,502

(22) Filed: Apr. 20, 2009

(65) Prior Publication Data
US 2009/0201887 A1   Aug. 13, 2009

Related U.S. Application Data

(63) Continuation of application No. 10/396,992, filed on Mar. 25, 2003, now Pat. No. 7,522,559.

(60) Provisional application No. 60/367,384, filed on Mar. 25, 2002.

(51) Int. Cl.
*H04W 4/00* (2006.01)

(52) U.S. Cl. .................. 370/332; 370/335; 370/432; 375/148

(58) Field of Classification Search .............. 370/329, 370/332, 335, 342, 431, 432, 479, 345, 336, 370/337; 455/450–452.2, 509–512, 515–517; 375/316, 150, 146–149, 152, 136; 717/146, 717/131, 141, 155
See application file for complete search history.

(56) References Cited

U.S. PATENT DOCUMENTS 6,151,502 A * 11/2000 Padovani et al. ............ 455/442
6,205,168 B1 * 3/2001 Somayazulu ................ 375/149

(Continued)

FOREIGN PATENT DOCUMENTS

CA   2399078   8/2001

(Continued)

OTHER PUBLICATIONS

Technical Specification Group Radio Access Network; Physical channels and mapping of transport channels onto physical channels (TDD) (Release 4), 3 GPP TS 25.221 V4.1.0 (Jun. 2001).

(Continued)

*Primary Examiner*—Ian N Moore
(74) *Attorney, Agent, or Firm*—Volpe and Koenig, P.C.

(57) ABSTRACT

The present invention is a receiver which includes a blind code detection device for determining the identity of a plurality of channels over which information is to be transmitted when the identity of all channels is not known by the receiver. The blind code detection device generates a candidate channel list filled with the identify of selected channels out of the plurality of channels. A multi-user detection device, responsive to the blind code detection device, processes those channels in the candidate code list.

18 Claims, 11 Drawing Sheets

U.S. PATENT DOCUMENTS

| | | |
|---|---|---|
| 6,445,727 B1 | 9/2002 | Davis et al. |
| 6,483,826 B1 | 11/2002 | Akerberg et al. |
| 6,498,935 B1 | 12/2002 | Cannon et al. |
| 6,501,788 B1 | 12/2002 | Wang et al. |
| 6,535,554 B1 | 3/2003 | Webster et al. |
| 6,574,270 B1 | 6/2003 | Madkour et al. |
| 2001/0022807 A1 | 9/2001 | Yotsumoto |
| 2003/0147455 A1* | 8/2003 | Simoni et al. ............... 375/148 |

FOREIGN PATENT DOCUMENTS

| | | |
|---|---|---|
| EP | 1 143 638 | 10/2001 |
| JP | 10-065572 | 3/1998 |
| JP | 10-145327 | 5/1998 |
| JP | 10/145327 | 5/1998 |
| JP | 2000-068979 | 3/2000 |
| JP | 2000-261411 | 9/2000 |
| JP | 2001-144636 | 5/2001 |
| JP | 2002-044053 | 2/2002 |
| KR | 20020008073 | 1/2002 |
| TW | 476199 | 2/2002 |
| WO | 01/97411 | 12/2001 |

OTHER PUBLICATIONS

Technical Specification Group Radio Access Network; Spreading and modulation (TDD)(Release 4), 3 GPP TS 25.223 V4.1.0 (Jun. 2001).

Third Generation Partnership Project; Technical Specification Group Radio Access Network; Physical channels and mapping of transport channels onto physical channels (TDD) (Release 1999), 3 GPP TS 25.221 V 3.9.0 (Dec. 2001).

Third Generation Partnership Project; Technical Specification Group Radio Access Network; Physical channels and mapping of transport channels onto physical channels (TDD) (Release 1999), 3 GPP TS 25.221 V 3.11.0 (Sep. 2002).

Third Generation Partnership Project; Technical Specification Group Radio Access Network; Physical channels and mapping of transport channels onto physical channels (TDD) (Release 4), 3 GPP TS 25.221 V4.1.0 (Jun. 2001).

Third Generation Partnership Project; Technical Specification Group Radio Access Network; Physical channels and mapping of transport channels onto physical channels (TDD) (Release 4), 3 GPP TS 25.221 V 4.3.0 (Dec. 2001).

Third Generation Partnership Project; Technical Specification Group Radio Access Network; Physical channels and mapping of transport channels onto physical channels (TDD) (Release 4), 3 GPP TS 25.221 V 4.7.0 (Dec. 2002).

Third Generation Partnership Project; Technical Specification Group Radio Access Network; Physical channels and mapping of transport channels onto physical channels (TDD) (Release 5), 3 GPP TS 25.221 V 5.3.0 (Dec. 2002).

Third Generation Partnership Project; Technical Specification Group Radio Access Network; Spreading and modulation (TDD), (Release 1999), 3 GPP TS 25.223 V 3.7.0 (Sep. 2001).

Third Generation Partnership Project; Technical Specification Group Radio Access Network; Spreading and modulation (TDD), (Release 1999), 3 GPP TS 25.223 V 3.8.0 (Mar. 2002).

Third Generation Partnership Project; Technical Specification Group Radio Access Network; Spreading and moducation (TDD), (Release 4), 3 GPP TS 25.223 V 4.1.0 (Jun. 2001).

Third Generation Partnership Project; Technical Specification Group Radio Access Network; Spreading and modulation (TDD), (Release 4), 3 GPP TS 25.223 V 4.3.0 (Dec. 2001).

Third Generation Partnership Project; Technical Specification Group Radio Access Network; Spreading and modulation (TDD), (Release 4), 3 GPP TS 25.223 V 4.5.0 (Dec. 2002).

Third Generation Partnership Project; Technical Specification Group Radio Access Network; Spreading and modulation (TDD), (Release 5), 3 GPP TS 25.223 V 5.2.0 (Dec. 2002).

* cited by examiner

| FIG. 10A | FIG. 10B |
|---|---|

METHOD AND APPARATUS FOR BLIND CODE DETECTION

CROSS REFERENCE TO RELATED APPLICATION

This application claims priority from U.S. Provisional Application No. 60/367,384, filed on Mar. 25, 2002 and U.S. application Ser. No. 10/396,992, filed Mar. 25, 2003, now U.S. Pat. No. 7,522,559, issued Apr. 21, 2009, the entirety of which is hereby incorporated by reference.

BACKGROUND

The present invention relates generally to Code Division Multiple Access (CDMA) communication systems. More specifically, the present invention relates to a CDMA receiver.

CDMA systems use spread spectrum techniques and multi-code operation to provide higher network capacity in a given bandwidth than a single-code system. The increased capacity may be directed to a single user or shared among multiple users.

To implement a receiver, a CDMA system generally requires knowledge of the identity of the codes used to construct the transmitted signal. The receiver in a User Equipment (UE) may know the identity of all codes, a subset of codes or none of the codes used for any given transmission. Codes associated with signals directed to the desired UE will be referred to hereinafter as "own-UE codes"; and codes associated with signals directed to other receivers will be referred to hereinafter as "other-UE codes." Typically, a system includes a means in the receiver to know or learn the identity of own-UE codes via initial programming, signaling, acquisition methods or various other techniques that may include trial and error, which may be inefficient from a power or performance standpoint. Systems may or may not provide a means to learn the identity of other-UE codes. Specific codes used to transmit data can be static or can change from time-to-time.

Demodulation of data associated with any one code is subject to degraded bit error rates (BER) caused by interfering own-UE codes and/or other-UE codes. The receiver can benefit from knowledge of the identity of own-UE or other-UE codes by implementing improved methods that provide a lower BER at a given signal-to-noise ratio in a radio channel with a certain multipath characteristic.

Multi-user detection (MUD) is one example of a receiver method that simultaneously processes received signals associated with multiple codes in an attempt to minimize the impact of interference and provide a lower BER, or the same BER in less favorable signal-to-noise-ratio (SNR) or multipath. MUD operates optimally when it is configured for the exact set of transmitted codes. To achieve this, MUD requires knowledge of the identity of transmitted own-UE codes and transmitted other-UE codes. In addition, MUD generally requires an estimate of the transmission channel over which the signal was sent. The estimate of the transmission channel is called the "channel response" or "channel estimate." The transmission channel may be the same for all codes. If transmit diversity, antenna beam steering or other methods of signaling diversity are used at the transmitter, then different transmission channels may be associated with different codes.

One approach to implementing MUD is to configure the receiver for all codes that may or may not have been transmitted. There are two disadvantages that render this approach undesirable, and possibly impractical. First, the more codes a MUD device is configured to process, the greater the number of computations that are required to demodulate the transmitted data. Hence, configuring a receiver only for codes that have been transmitted requires less power and less processing time. Second, the BER is often degraded if the MUD is configured to process a relatively large number of codes. Hence, configuring a receiver only for codes that have been transmitted generally provides an improvement in BER.

In timeslotted CDMA systems that employ MUD, for example, in 3GPP TDD systems, one or more channelization codes in one or more timeslots are allocated to coded composite transport channels (CCTrCHs). In each timeslot, multiple CCTrCHs may be transmitted and may be directed to one or more UEs.

Each transmitted code is associated with a midamble code shift that may or may not be shared with other transmitted codes. The UE estimates the channel response by processing received midambles. The association between midamble code shift and transmitted codes is not explicit since detection of a particular midamble code shift does not guarantee that an associated code has been transmitted. However, in the specific case of Kcell=16 in TDD, the association is unique.

As one example, during call set-up, a CCTrCH is provided with an allocation of channelization codes and timeslots and these are signaled to the UE. Therefore, the UE has a list of allocated codes. However, since not all allocated codes are used in every transmission, the UE has partial information, (i.e. the information regarding own-UE codes). The list of other-UE codes is not available, except in certain cases where some hint as to the total number of codes is indicated through physical layer signaling.

Each transmitted code is a combination of a channelization code, a channelization code specific multiplier and a scrambling code. The scrambling code is signaled to the UE and the code specific multipliers are associated with channelization codes, so the identity of the channelization code itself is the only one of the three that needs to be determined.

If a code allocated to a CCTrCH is not transmitted, then the CCTrCH is in discontinuous transmission (DTX). A CCTrCH is said to be in "partial DTX" if not all of the allocated codes are transmitted in a given timeslot. It is said to be in "full DTX" if none of the allocated codes are transmitted in a frame.

The identity of the transmitted codes for an entire frame can be derived from the Transport Format Combination Index (TFCI) that is signaled to the UE and is multiplexed with the data signal. The TFCI is transmitted in the first timeslot allocated to a CCTrCH, and optionally in subsequent timeslots in the same frame. Each UE can process the received TFCI to determine the transmitted own-UE codes in each timeslot of the frame. However, this requires demodulating received data symbols and executing various other processes to decode and interpret the TFCI information. In certain receiver implementations, the inherent latency of these processes could result in the identity of transmitted own-codes not being available when received data in the first timeslot (and possibly some subsequent timeslots) in the frame are processed in a MUD-device.

Accordingly, there exists a need for an improved receiver which has the ability to more effectively identify the incoming channels.

SUMMARY

The present invention is directed to a receiver for receiving communication signals in time frames divided into a plurality of timeslots, wherein the timeslots include data signals for a plurality of channels. The receiver includes: 1) a data estimation device for decoding the data signals of the timeslot, which comprises a blind code detection device for determining the identity of the plurality of channels when the identity of all channels is not known by the receiver and generating a candidate channel list filled with the identity of selected channels out of the plurality of channels; and 2) a MUD-device, responsive to the blind code detection device, for processing those channels in the candidate code list.

BRIEF DESCRIPTION OF THE DRAWING(S)

Figures 10, 10A:
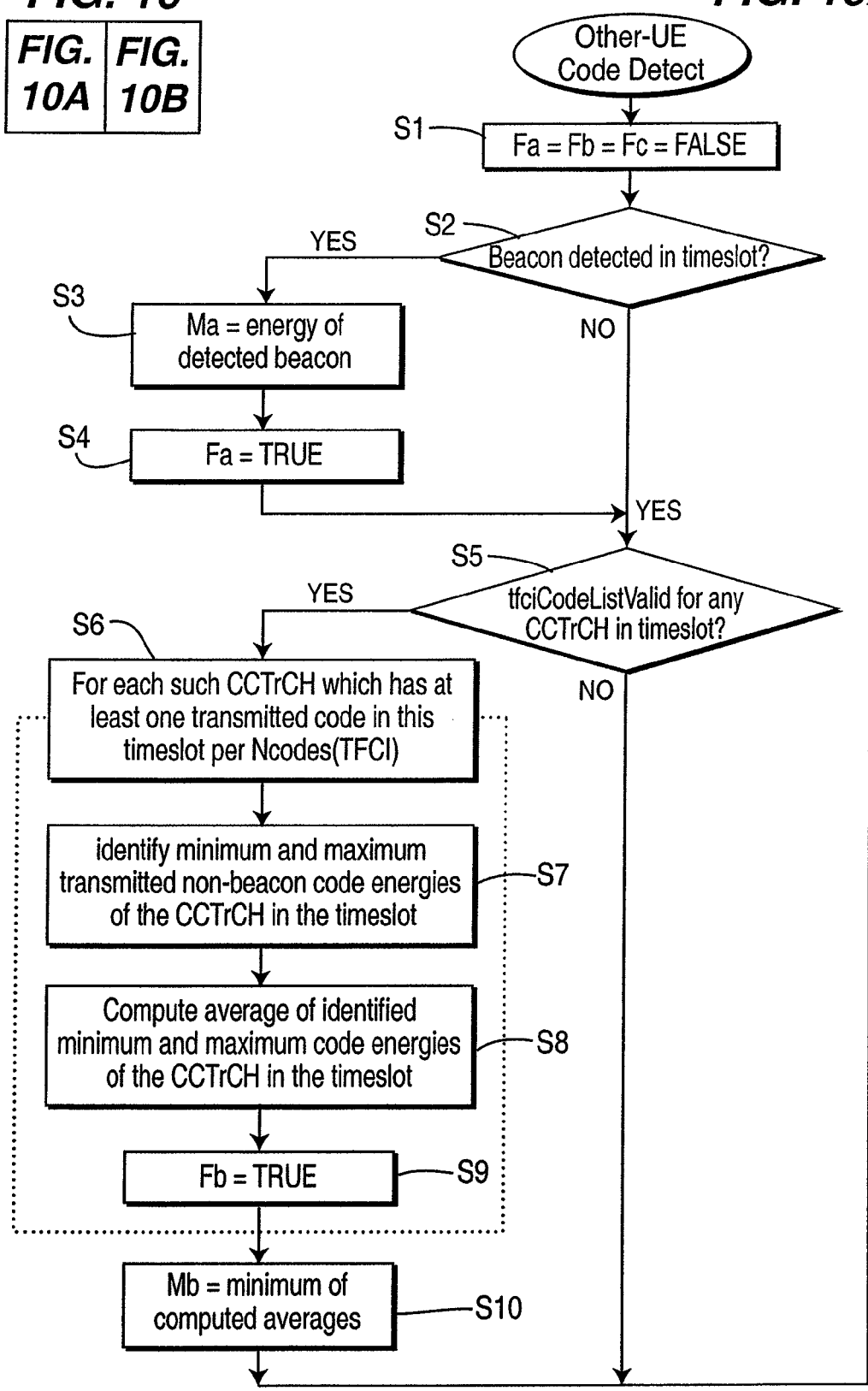

FIGS. 10A an 10B, taken together, show a procedure for the other-UE code detect function in accordance with the preferred embodiment of the present invention.

Figure 10B:
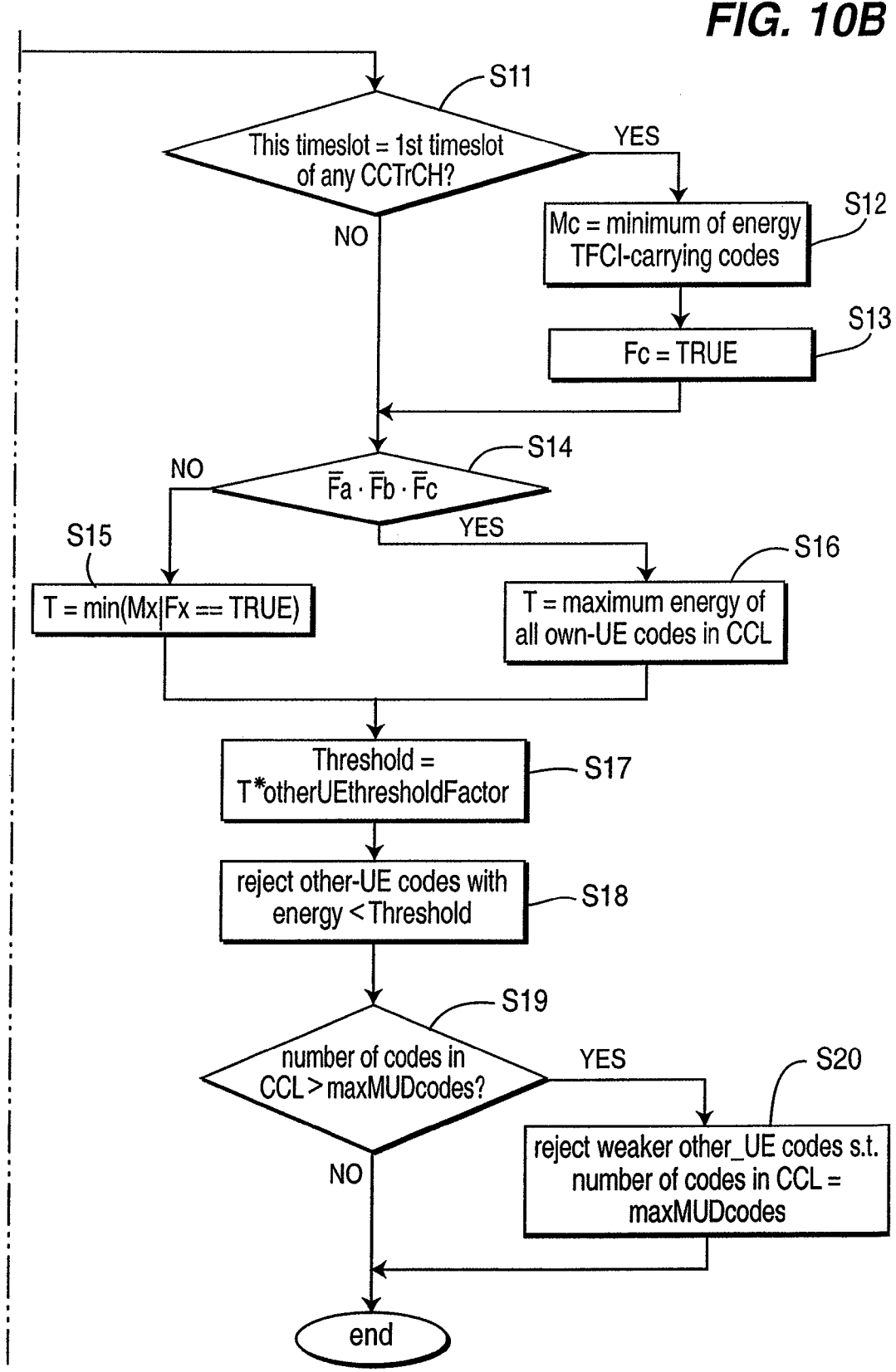

FIG. 10 shows the manner in which FIGS. 10A and 10B are arranged relative to one another.

DETAILED DESCRIPTION OF THE PREFERRED EMBODIMENT(S)

Figure 1:
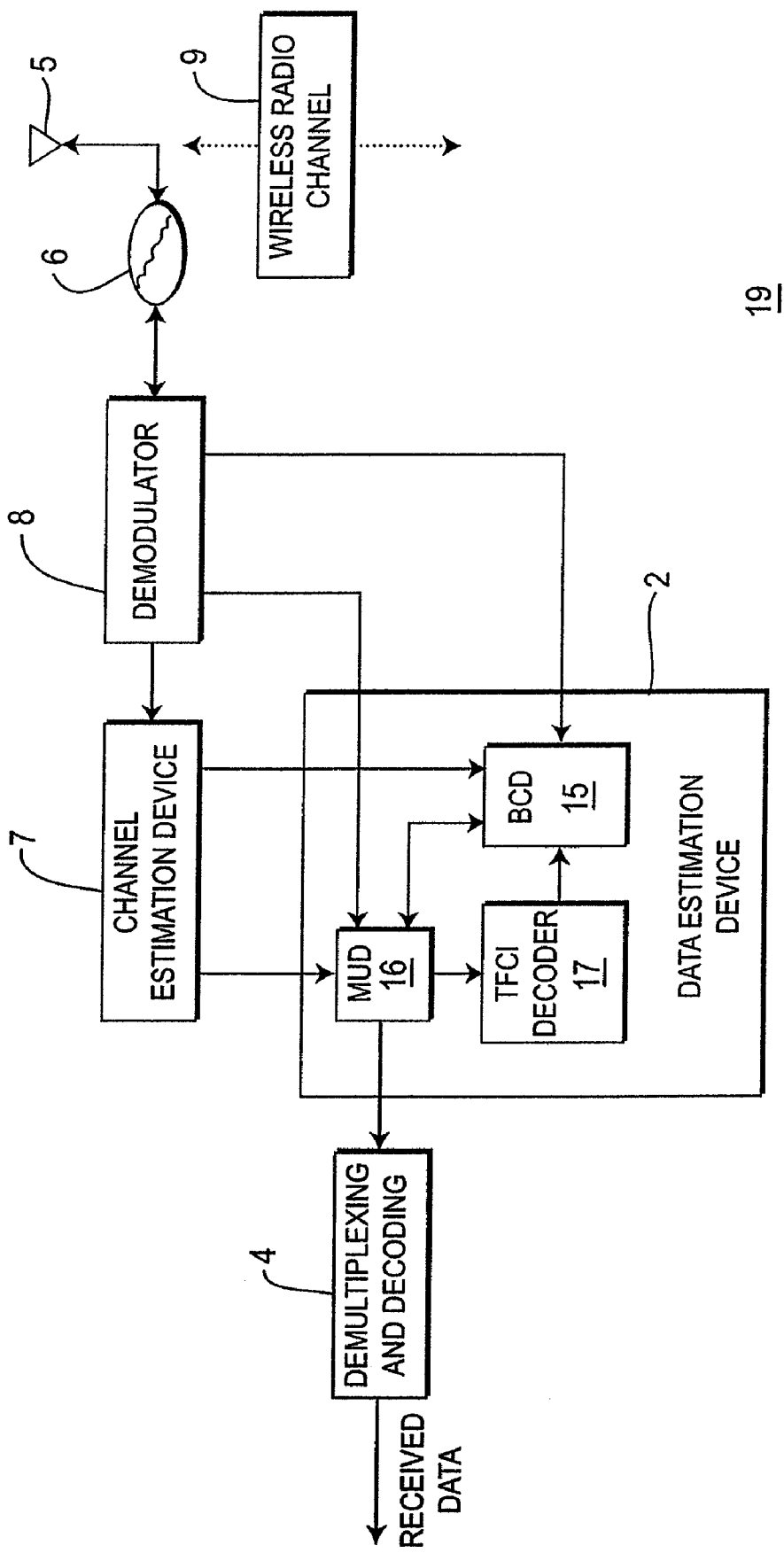
FIG. 1 is a block diagram of a receiver in accordance with the preferred embodiment of the present invention.

Referring to FIG. 1, a receiver 19, preferably at a user equipment (UE), (mobile or fixed), comprises an antenna 5, an isolator or switch 6, a demodulator 8, a channel estimation device 7 and a data estimation device 2. After the data estimation device 2, the signals are forwarded to a demultiplexer/decoder 4 to be processed in accordance with well known methods. The data estimation device 2, coupled to the demodulator 8 and the channel estimation device 7, comprises a blind code detection (BCD) device 15, a multi-user detection (MUD) device 16 and a TFCI decoder 17. The MUD device 16 decodes the received data using the channel impulse responses from the channel estimation device and a set of channelization codes, spreading codes and channel response offsets from the BCD device 15. The MUD device 16 may utilize any current MUD method to estimate the data symbols of the received communication, such as a minimum mean squared error block linear equalizer (MMSE-BLE), a zero-forcing block linear equalizer (ZF-BLE) or a plurality of joint detectors, each for detecting one of the pluralities of receivable CCTrCHs associated with the UE. Although the BCD device 15 is illustrated as a separate device, the BCD device 15 may be incorporated as a part of the MUD device 16. If desired, the code energy measurement part of BCD may be part of the MUD, i.e. a front end component of the MUD (the matched filter) is the same as the BCD code energy measurement function, which measures code energy of a set of codes, the BCD output is fed back to the MUD such that the remaining MUD functions operate on only a subset of the codes originally measured by the front end.

The BCD device 15 is coupled to demodulator 8, channel estimation device 7, TFCI decoder and MUD 16. Channel estimation output of device 7 is an input to the code energy measurement function of the BCD device 15. The BCD device 15 provides the set of the channelization codes, spreading factors and channel response offsets to the MUD (or single user detection, i.e., SUD) devices 10 for use in the current timeslot. The BCD 15 executes for every timeslot in a frame for which the UE has a downlink allocation.

The Blind Code Detection function provides to the MUD or the SUD the set of the channelization codes, spreading factors and channel response offsets to be used in the current timeslot. It also indicates to the TPC function those channelization codes that are to be used for the SIR measurement.

In the MUD configuration, BCD 15 measures code energies and makes decisions about which own-UE and other-UE codes to include or not include in the output Detected Code list. Detected code list is defined herein as that list of codes which remain when all of the codes in the candidate list have been examined and those not meeting all of the aforesaid criteria are removed from the candidate code list. Basically, the BCD fills the candidate code list based on the code allocation and midamble allocation method, then deletes some of the codes from the list based on energy measurement or TFCI, which is what is output to the MUD. In CELL_DCH state, the P-CCPCH and up to four DCH CCTrCHs allocated to own-UE may be present, along with codes for other UEs. In CELL_FACH state, the P-CCPCH and one common channel CCTrCH designated for own-UE may be present, along with codes for other UEs. A common channel code is treated the same as an own-UE DCH code, except that a common channel code transmitted as a beacon is considered as detected if its respective midamble was detected by the Midamble Detection function, regardless of its code energy. The P-CCPCH is treated as its own unique CCTrCH: it has no TFCI and thus is not subject to the TFCI tests in the Code Detect function, but since it is always transmitted as a beacon, its detection decision is only based on its midamble detection, otherwise it is treated as any other common channel. The identities of transmitted and non-transmitted codes signaled by a TFCI and made available by the fast-TFCI function one or two timeslots after receipt of the TFCI are exploited, when available.

In the single user detection (SUD) configuration, all allocated own-UE codes are included in, and any other-UE codes are excluded from, the output Detected Code list. Because the MUD configuration will be selected for timeslots containing common channels, the SUD configuration does not contain any special logic for the P-CCPCH. BCD uses the following sub functions as illustrated in FIG. 2.

Figure 2:
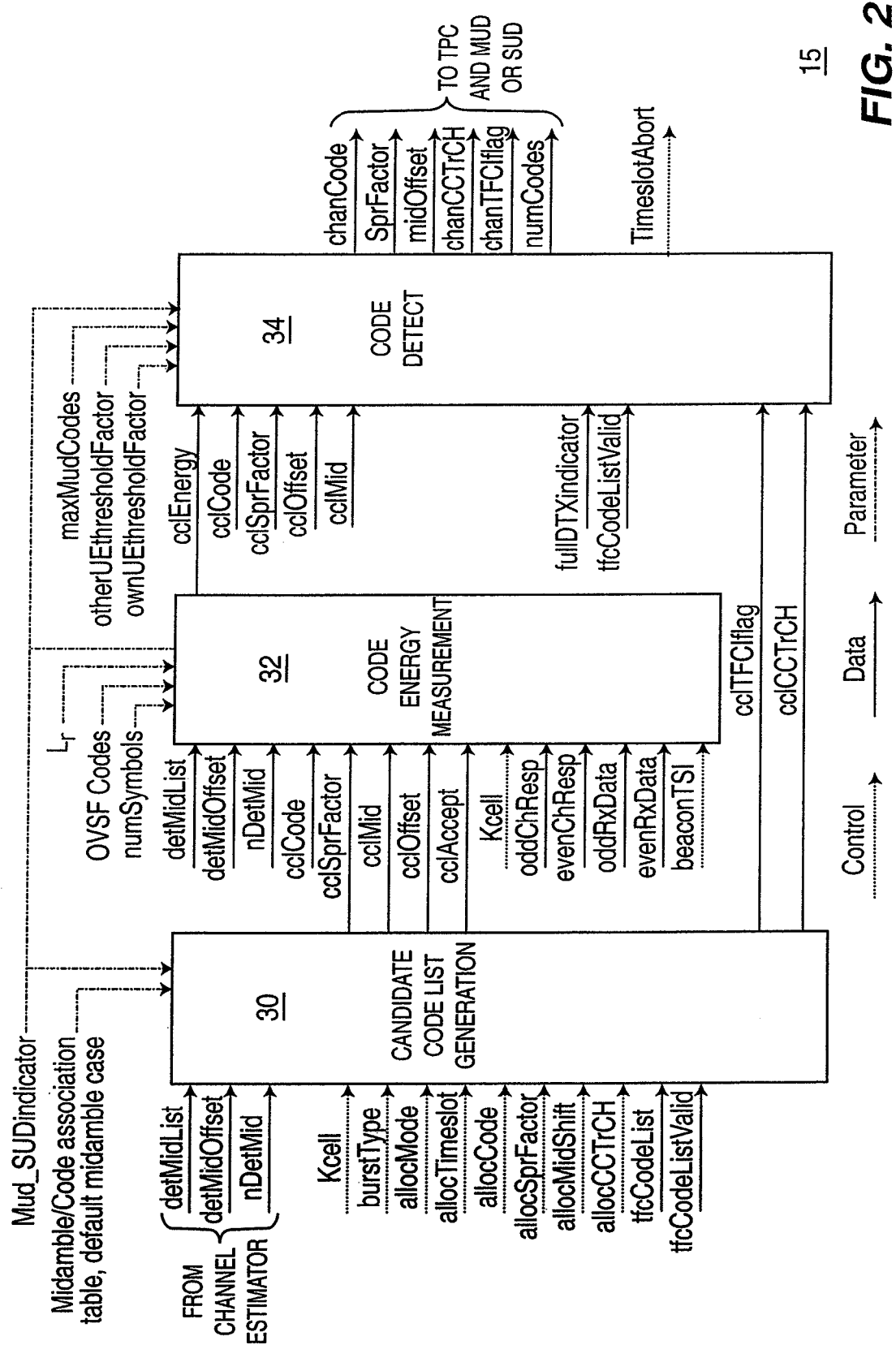
FIG. 2 is a block diagram of a blind code detection block diagram in accordance with the preferred embodiment of the present invention.

Referring to FIG. 2, the blind code detection (BCD) device 15 comprises: a candidate code list generator 30; a code energy measurement unit 32; and a code detection unit 34. The inputs and outputs of these units are also shown in FIG. 2.

Candidate Code List Generation (30)

Depending on the timeslot midamble allocation scheme, beacon indicator and possibly the detected midamble shifts and received TFCI, candidate channelization codes for both own-UE and other UEs (for MUD configuration only) are selected.

Code Energy Measurement (32)

For the MUD configuration, the energy of each of the candidate codes is measured based on the soft symbols of the candidate codes at the output of a matched filter.

Code Detect (34)

Code detect does the following:

Own-UE Code Detect (for MUD configuration only)

Candidate codes of each CCTrCH are kept in or rejected from the candidate list depending on their code energy, Full DTX status, status of the received TFCI and relative timeslot within the frame.

Other-UE Code Detect (for MUD configuration only)

Once own-UE codes have been detected, other-UE codes are detected depending on their code energy with a threshold based on the energies of own-UE codes and whether or not it is known that at least one own-UE code was definitely transmitted.

Reject certain weak codes if too many codes remain as accepted after the above threshold tests Format output for MUD or SUD Inputs Data Data received at Code Energy Measurement (CEM) 32:

oddRxData, odd received data (after midamble cancellation).

evenRxData, even received data (after midamble cancellation) at 32 oddChResp $\vec{h}_o^{(k)}$, k=1, 2, ..., K, odd channel response.

evenChResp $\vec{h}_e^{(k)}$, k=1, 2, ..., K, even channel response.

The list of midamble shifts detected by channel estimation function 7, are provided to Candidate Code List Generator (CCLG) 30 and include:

detMidList(16), the shift number (k value) of detected midambles, 0=no valid entry.

detMidOffset(16), the channel response offset of detected midambles.

nDetMid, the number of valid items in detMidList and detMidOffset.

The full discontinuous transmission (DTX) indicator, is set if CCTrCH is in full DTX and is provided to Code Detect (CD) 34.

The tfcCodeList(4,224), the list of transmitted codes in the frame, as indicated by the received TFCI, per CCTrCH, 16 codes×14 timeslots, is provided to CCLG 32.

tfcCodeListValid(4), is set if the received TFCI has been decoded by the fast-TFCI process and tfcCodeList contains valid data, per CCTrCH and is provided to CCLG 30.

Control

KCELL, the maximum number of midamble shifts, this timeslot is provided to CCLG 30 and CEM 32.

burstType, burst type, this timeslot is provided to CCLG 30.

beaconTSI, Beacon timeslot indicator is provided to CEM 32.

allocMode, midamble allocation mode (Default, Common or UE Specific), this timeslot is provided to CCLG 30.

MUD_SUDindicator, indicates MUD or SUD active in this timeslot and is provided to CCLG 30, CEM 32 and CD 34.

The list of parameters of PhCHs allocated to own UE, are of the form:

allocCode(phy chan), the channelization codes of allocated PhCHs is provided to CCLG 30.

allocTimeslot(phy chan), the timeslots of allocated PhCHs is provided to CCLG 30.

allocSprFactor(phy chan), the spreading factors of allocated PhCHs is provided to CCLG 30.

allocMidShift(phy chan), the midamble shifts of allocated PhCHs is provided to CCLG 30.

allocCCTrCH(phy chan), the CCTrCH numbers of allocated PhCHs {1-4=own-UE or common channel CCTrCH, 5=P-CCPCH} is provided to CCLG 30.

Outputs

Data

The detected code list, are provided by CD 34 and are of the form:

chanCode(16), the channelization codes of detected codes, 0=no valid entry.

sprFactor(16), the spreading factors of detected codes.

midOffset(16), the channel response offsets of detected codes.

chanCCTrCH(16), the CCTrCH number of detected code {0=other UE code, 1-4=own-UE or common channel CCTrCH5=P-CCPCH} chanTFCIflag(16), set if code carries the TFCI in its CCTrCH.

numCodes, the number of valid items in chanCode, sprFactor and midOffset.

Control timeslotAbort, set if no own-UE codes or P-CCPCH to demodulate and thus further processing of the timeslot is required.

The blind code detection procedure operates every DL timeslot.

Parameters ownUEthresholdFactor, set to 0.1 and is provided to CD 34.

otherUEthresholdFactor, set to 0.7 and is provided to CD 34.

maxMudCodes, the largest number of channelization codes the MUD can support, default set to 14, is provided to CD 34.

numSymbols, the number of symbols for estimating code energy, default set to 30, could be as large as 61 (entire first data field), is provided to CEM 32.

Midamble/Code association, default midamble case (see Table 1), is provided to CCLG 30.

Beacon code(s) (always code number=1 (and 2, if SCTD is applied), SF=16).

Beacon shift (always k=1). Midamble k=1 is used for the first antenna and k=2 is used for the diversity antenna if SCTD is applied for the beacon channel.

Orthogonal variable spreading factor (OVSF) Codes, SF=16 only (see Table 1) is provided to CEM 32.

$L_r$, channel response lengths (see Table 1) are provided to CEM 32.

Implementation Requirements

As one example, the fixed-point requirements for the blind code detection block are shown in Table 1 (however, the number of bits used may be changed, if desired).

TABLE 1

| Fixed point configuration for blind code detection block | | |
|---|---|---|
| RxChip | Q | 5 |
|  | Word size | 6 |
| RxChresp | Q | 5 |
|  | Word size | 6 |

TABLE 1-continued

Fixed point configuration for blind code detection block

| A | Q | 5 |
|---|---|---|
|   | Word size | 10 |
| AHr | Q | 5 |
|   | Word size | 10 |
| midDetMidambleEnergy | Q | 5 |
|   | Word size | 7 |
| MidDetThresh | Q | 5 |
|   | Word size | 6 |
| ChannelEnergy | Q | 10 |
|   | Word size | 13 |
| CodeEnergy | Q | 2 |
|   | Word size | 11 |
| cclEnergyForCodeEngBlockOutput | Q | 2 |
|   | Word size | 9 |
| cclEnergyForCodeDetBlockInput | Q | 2 |
|   | Word size | 9 |
| codeDetSumAvgEnergy | Q | 2 |
|   | Word size | 15 |
| codeDetAveEnergy | Q | 2 |
|   | Word size | 11 |
| codeDetThreshFactor | Q | 5 |
|   | Word size | 6 |
| CodeDetThresh | Q | 3 |
|   | Word size | 11 |
| scaledChanEnergy | Q | 6 |
|   | Word size | 11 |
| SymbEnergy | Q | 4 |
|   | Word size | 13 |
| Accum | Word size | 16 |
|   | Word size | 15 |
| Code Detect Threshold | Q | 5 |
|   | Word size | 15 |

Candidate Code List Generation (CCLG) 30

Functional Description

The candidate code list is the list of the channelization codes and associated parameters which may have been received in the timeslot and which are later subject to the threshold tests of the code detect (CD) function 34. The list is determined based upon the midamble allocation scheme of the timeslot, the detected midamble shifts, and information about the known number of transmitted codes derived from the received TFCI, if available from the fast-TFCI process. In beacon timeslots, codes of detected beacon midambles are tagged to prevent rejection by the Code Detect (CD) function 34.

Beacons transmitted with SCTD require special handling in generation of the candidate code list (ccl). If only one of the two beacon midambles is detected, either only one was transmitted, or both were transmitted but only one received. In this case, the one detected beacon is entered into the candidate code list as code 1 or code 2, depending if k=1 or k=2 is detected. If both beacon midambles are detected, and SCTD is not known to be OFF, the two beacon codes are in essence collapsed into each other in the A matrix, and thereafter treated as one code. In this case, only one code, code 1 & k=1, should be entered into the candidate code list. The k=2 beacon is not transmitted by itself.

Default Midamble Allocation Scheme

In the default midamble allocation scheme, each detected midamble explicitly indicates a set of channelization codes which may have been transmitted and should be included in the candidate code list. In beacon timeslots, the first and the second beacon code are included in the candidate code list if their respective midamble was detected; the beacon codes are flagged as not to be rejected by the Code Detect function 34. Once the candidate codes and their associated midamble shifts have been entered into the candidate code list, the list of parameters of PhCHs allocated to own UE is searched to identify own-UE candidate codes and their parameters. For own-UE codes, if the transmitted codes are known from the fast TFCI, the candidate code list is adjusted accordingly.

Figure 3:
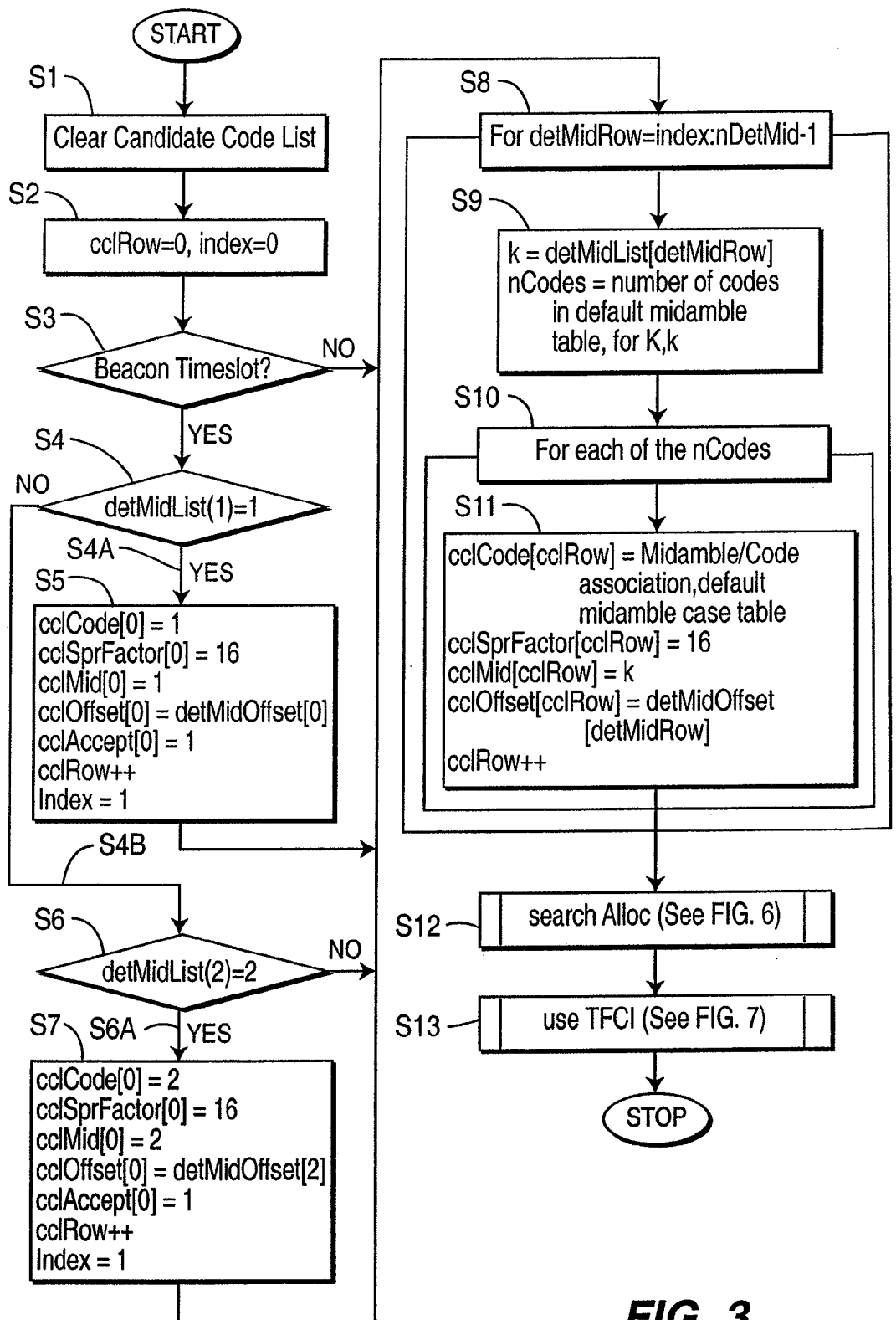
FIG. 3 is a procedure for generation of the candidate code list in the default midamble case in accordance with the preferred embodiment of the invention.

The procedure is as follows and as shown in the flowchart in FIG. 3. The steps are:

Clear the candidate code list (S1).

Initialize at (S2), setting cclRow=1, index=0

In the presence of beacon timeslots (S3),

At S4, if Midamble Detection has reported the first beacon midamble, S4A, at S5, enter the first beacon midamble into the candidate code list along with its channelization code, channel response offset and spreading factor, and set cclAccept flag for the beacon code such that it cannot be rejected by the Code Detect function.

if Midamble Detection has not reported the first beacon midamble, S4A, but has reported the second beacon midamble, S6A, at S7, do the same for the second midamble.

Find the codes for each (remaining, if this is a beacon timeslot) detected midamble in Table 1, at S8. S8 loops to examine all midambles.

At S10 and S11, copy the found codes into the candidate code list, at S12, along with their associated midamble shifts, channel response offsets and spreading factors. S10 loops until all n Codes are examined. S11 loops for all of the rows (16).

After all codes have been entered into the candidate code list, search own-UE allocation list for each candidate code. The search Alloc routine (S12) is shown in greater detail in FIG. 6. For candidate codes found in the own-UE allocation list, add to the candidate code list their CCTrCH number. Candidate codes not found in the own-UE allocation list will retain the cleared CCTrCH number of zero, which will indicate that the code is not allocated to own-UE.

For own-UE codes, for each CCTrCH, if the transmitted codes in this timeslot are known from the Fast TFCI, at S13:

For transmitted codes, set the cclAccept flag such that they cannot be rejected by the Code Detect function.

For non-transmitted codes, delete them from the candidate code list. The use TFCI routine is shown in greater detail in FIG. 7.

Common Midamble Allocation Scheme

In the common midamble allocation scheme, in non-beacon timeslots, only one (the "common") midamble shift is transmitted. It indicates a set containing the number of channelization codes transmitted in the timeslot. In beacon timeslots, one or two beacon midamble shifts plus the common midamble shift, which indicates the number of channelization codes in the timeslot are transmitted. The beacon codes and their midamble shifts are included in the candidate code list if their respective midamble shifts were detected and those codes are flagged as not to be rejected by the Code Detect function. The number of channelization codes indicated by the common midamble shift is not used. If the common midamble shift is not detected, there are no codes, other than possibly beacon codes, to insert into the candidate code list. In beacon timeslots, the candidate code list is filled with all 14 remaining SF=16 channelization codes, each associated with the detected common midamble shift. In non-beacon timeslots, there can be either one SF=1 code or up to 16 SF=16 codes in the timeslot; the SF of one code in this timeslot in the own-UE allocation list is checked and used to decide to fill the candidate code list with one SF=1 code or 16 SF=16 codes, each associated with the detected common midamble shift.

Once the candidate codes and their associated midamble shifts have been entered into the candidate code list (ccl), the list of parameters of PhCHs allocated to own-UE is searched to identify own-UE candidate codes and their parameters. The P-CCPCH cannot be in a common midamble timeslot. For own-UE codes, if the transmitted codes are known from the fast TFCI, the candidate code list is adjusted accordingly.

Figure 4:
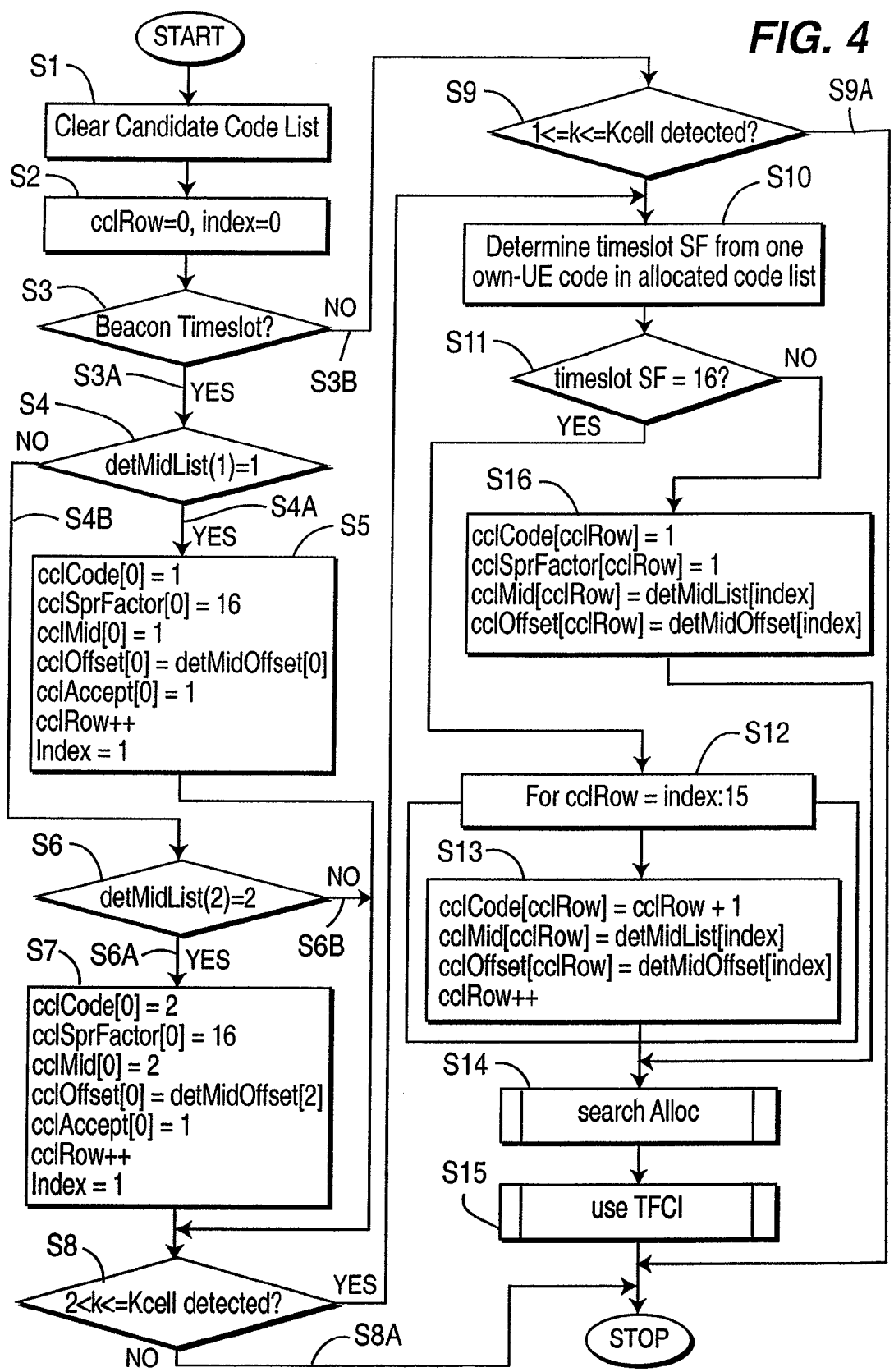
FIG. 4 is a procedure for generation of the candidate code in the common midamble case in accordance with the preferred embodiment of the invention.

The procedure is as follows, as shown in the following flowcharts:

Making reference to FIG. 4;
  at S1, clear the candidate code list and initialize at S2.
  In beacon timeslots, S3A,
    if Midamble Detection has reported the first beacon midamble, at S4A, enter the first beacon midamble into the candidate code list along with its channelization code, channel response offset and spreading factor, and set cclAccept flag for the beacon code such that it cannot be rejected by the Code Detect function, at S5.
    if Midamble Detection has not reported the first beacon midamble, at S4B, but has reported the second beacon midamble S6A, do the same for the second midamble, at S7.
    stop if the common midamble shift (2<k<=Kcell) was not detected, at S8A.
    enter into the candidate code list all remaining channelization codes, along with the common midamble shift and SF=16.
  In non-beacon timeslots, at S3B:
    stop if the common midamble shift, as specified below, was not detected, at S9A
      All but Kcell=4: 0<k<=Kcell
      Kcell=4: k=1, 3, 5 or 7
    determine from the own-UE allocation list if this is an SF=16 or SF=1 timeslot, at S11.
    Enter into the candidate code list all spreading factors (SF), where SF=16, at S12, and S13, or one SF=1, at S16, channelization code(s), along with the common midamble shift and the SF.
  After all codes have been entered into the candidate code list, search own-UE allocation list for each candidate code, at S14. For candidate codes found in the own-UE allocation list, add to the candidate code list their CCTrCH number. Candidate codes not found in the own-UE allocation list will retain the cleared CCTrCH number of zero, which will indicate that the code is not allocated to own-UE.
  For own-UE codes, for each CCTrCH, if the transmitted codes in this timeslot is known from the Fast TFCI, S15:
    For transmitted codes, set the cclAccept flag such that they cannot be rejected by the Code Detect function.
    For non-transmitted codes, delete them from the candidate code list.

UE Specific Midamble Allocation Scheme

In all midamble allocation schemes, the UE has a priori knowledge of midamble shifts allocated to own-UE codes. In the Default and Common midamble allocation schemes, the UE knows the midamble-to-code associations for codes possibly allocated to other UEs. However, in the UE Specific midamble allocation scheme, the UE has no knowledge of midamble-to-code associations for codes possibly allocated to other UEs. Because the UE has no knowledge of other-UE midamble shift and channelization code associations, it is impractical to detect other-UE channelization codes. Thus, for every detected midamble shift, the UE simply searches its allocation list and adds to the candidate code list those codes associated with it; no other-UE channelization codes are added to the candidate code list. In beacon timeslots, if the first or second beacon midambles were detected, their respective codes are flagged as not to be rejected by the Code Detect function. The P-CCPCH cannot be in a UE Specific timeslot. For all CCTrCHs, if the transmitted codes are known from the fast TFCI, the candidate code list is adjusted accordingly.

Figure 5:
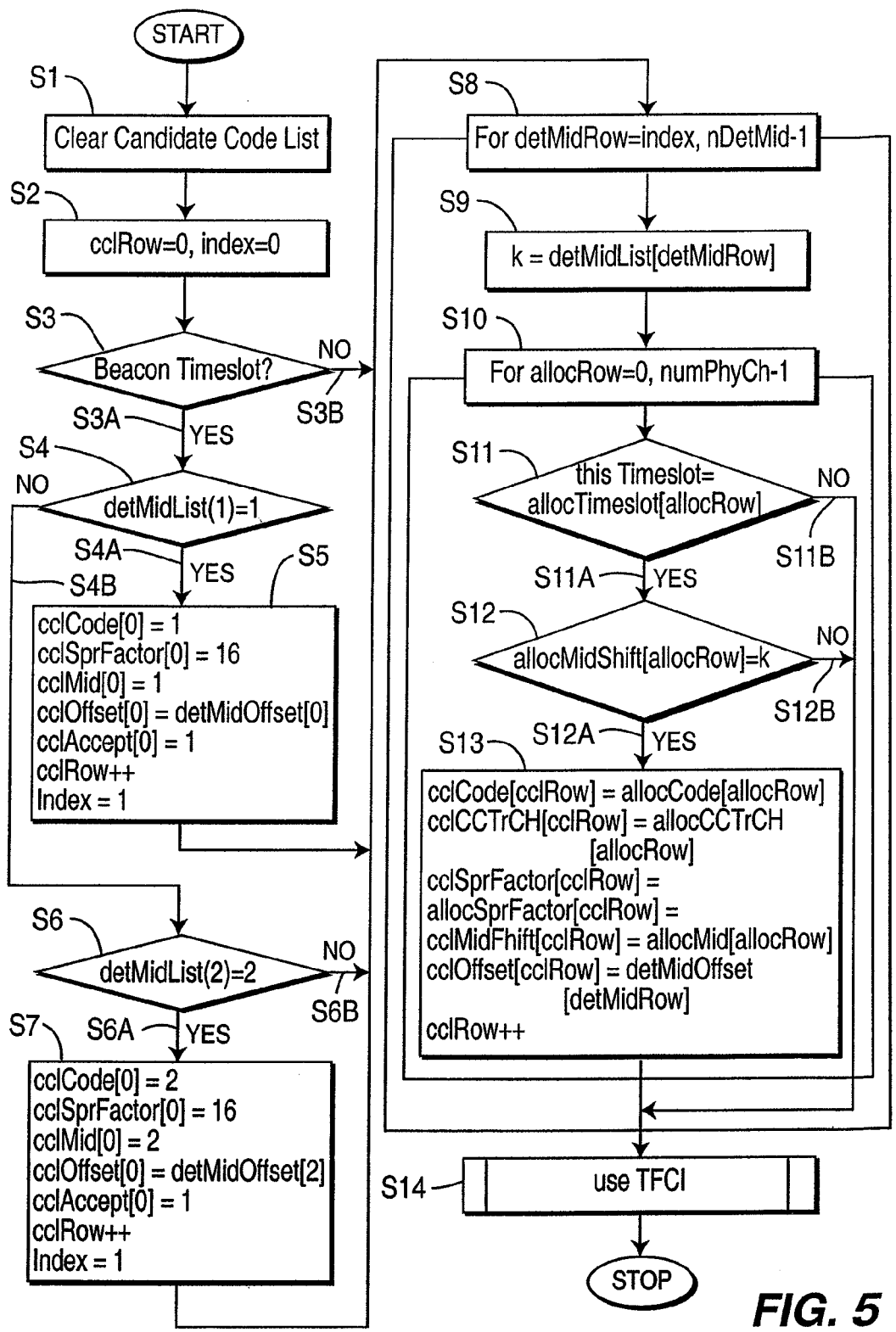
FIG. 5 is a procedure for generation of the candidate code list in the UE specific case in accordance with the preferred embodiment of the invention.

The procedure is as follows and as shown in the flowchart in FIG. 5:
  at S1, clear the candidate code list and initialize at S2.
  In beacon timeslots, S3A,
    if Midamble Detection has reported the first beacon midamble, S4A enter the first beacon midamble into the candidate code list along with its channelization code, channel response offset and spreading factor, and set cclAccept flag for the beacon code such that it cannot be rejected by the Code Detect function, at S5;
    if Midamble Detection has not reported the first beacon midamble, S4B, but has reported the second beacon midamble, S6A, do the same for the second midamble, at S7.
  For each detected midamble shift, search own-UE allocation list for channelization codes associated with that midamble shift in this timeslot.
  Copy the found codes into the candidate code list, along with their associated midamble shifts, channel response offsets, spreading factors and CCTrCH.
  For own-UE codes (the only codes in the candidate list in this case), for each CCTrCH, if the transmitted codes in this timeslot are known from the Fast TFCI, at S14:
    For transmitted codes, set the cclAccept flag such that they cannot be rejected by the Code Detect function.
    For non-transmitted codes, delete them from the candidate code list.

Search Allocated Code List

Figure 6:
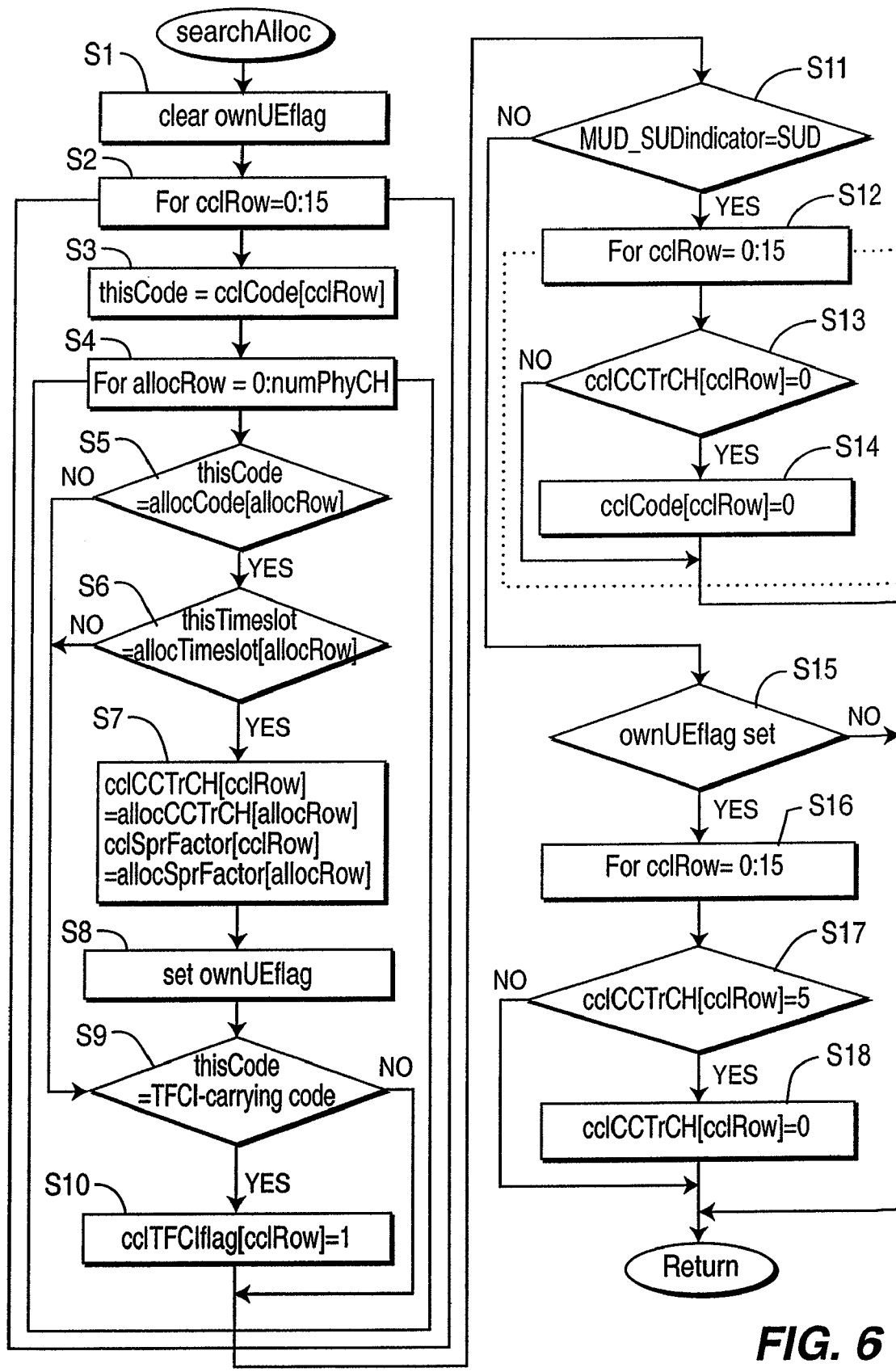
FIG. 6 is a procedure for search allocation (searchAlloc) function in accordance with the preferred embodiment of the invention.

The SearchAlloc function, shown in FIG. 6, is used for the Common and Default midamble allocation schemes after all candidate codes have been entered into the candidate code list. The own-UE allocation list is searched; any candidate codes found in the allocation list are, by definition, allocated to own-UE. The CCTrCH numbers of found candidate codes are copied to the candidate code list. Candidate codes not found in the own-UE allocation list will retain the cleared CCTrCH number of zero, which will indicate that the code is not allocated to own UE.

For the single-user detection (SUD) configuration (S11), codes belonging to other UEs are deleted from the candidate code list (S14).

Use TFCI Function

Figure 7:
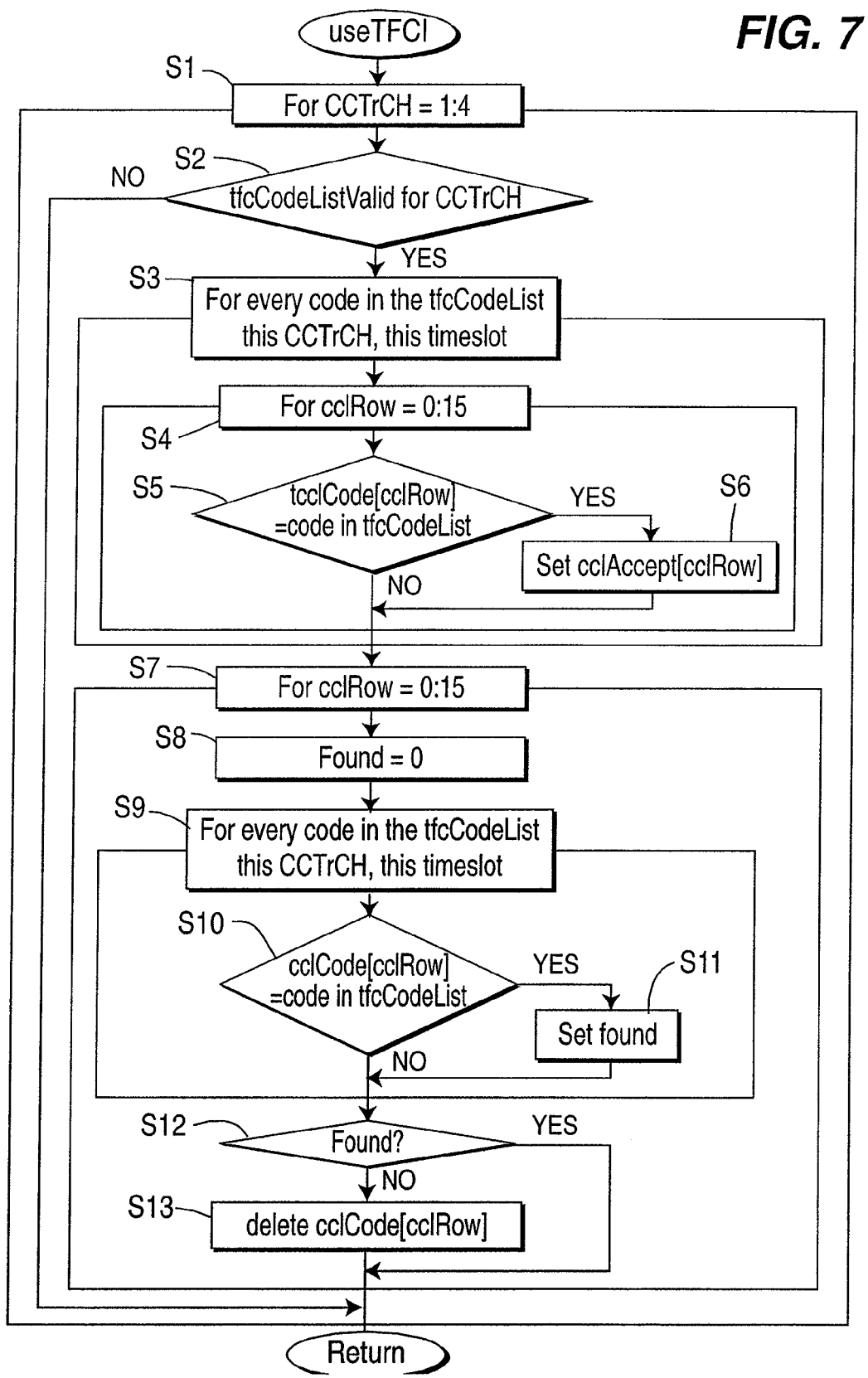
FIG. 7 is a procedure for the useTFCI function in accordance with the preferred embodiment of the invention.

This function, useTFCI, shown in FIG. 7 prevents rejection by Code Decision of codes which are known to have been transmitted, and removes from the candidate code list codes known to have not been transmitted (S12, S13). It is used for those CCTrCHs that the TFCI has been decoded by the fast-TFCI process and information about transmitted codes is thus available.

Inputs
  Data
    The list of midamble shifts detected by channel estimation function, of the form:
      detMidList(16), the shift number (k value) of detected midambles, 0=no valid entry, however, any other number may be used (99, for example) to indicate an invalid entry.

detMidOffset(16), the channel response offset of detected midambles.

nDetMid, the number of valid items in detMidList and detMidOffset.

tfcCodeList(4,224), the list of transmitted codes in the frame, as indicated by the received TFCI, per CCTrCH, 16 codes×14 timeslots.

tfcCodeListValid(4), set if the received TFCI has been decoded by the fast-TFCI process and tfcCodeList contains valid data, per CCTrCH.

Control

KCELL, the maximum number of midamble shifts, this timeslot.

burstType, burst type, this timeslot.

beaconTSI, Beacon timeslot indicator.

allocMode, midamble allocation mode (Default, Common or UE Specific), this timeslot.

MUD_SUDindicator, indicates MUD or SUD active in this timeslot.

The list of parameters of PhCHs allocated to own UE, of the form:
  allocCode(phy chan), the channelization codes of allocated PhCHs.
  allocTimeslot(phy chan), the timeslots of allocated PhCHs.
  allocSprFactor(phy chan), the spreading factors of allocated PhCHs.
  allocMidShift(phy chan), the midamble shifts of allocated PhCHs.
  allocCCTrCH(phy chan), the CCTrCH numbers of allocated PhCHs {1-4=own-UE or common channel CCTrCH, 5=P-CCPCH}.

Outputs

Data

The candidate code list, of the form
  cclCode(16), the OVSF channelization code numbers of candidate codes.
  cclMid(16), the midamble shifts of candidate codes.
  cclOffset(16), the channel response offset of the candidate codes.
  cclSprFactor(16), the spreading factors of the candidate codes.
  cclAccept(16), the accept flags of the candidate codes.
  chanCCTrCH(16), the CCTrCH number of detected code {0=other UE code, 1-4=own-UE or common channel CCTrCH, 5=P-CCPCH}
  cclTFCIflag(16), set if code carries the TFCI in its CCTrCH.

Control

None

Frequency of Operation

This function operates every DL timeslot.

Parameters

Midamble/Code association, default midamble case (see Table 2), B=beacon timeslot, NB=non-beacon timeslot.

TABLE 2

Midamble/Code association, default midamble case

| | Burst Type = 1 | | | | | Burst Type = 2 | |
| --- | --- | --- | --- | --- | --- | --- | --- |
| | $K_{CELL} = 16$ | | $K_{CELL} = 8$ | | | | |
| k | NB | B | NB | B | $K_{CELL} = 4$ | $K_{CELL} = 6$ | $K_{CELL} = 3$ |
| 1 |  | 1 | 1, 2 | 1 | 1, 2, 3, 4 | 1, 2 | 1, 2, 3, 4 |
| 2 | 3 |  | 3, 4 | 2 |  | 9, 10 | 9, 10, 11, 12, 13, 14, 15, 16 |
| 3 |  | 5 | 5, 6 |  | 5, 6, 7, 8 | 5, 6, 7, 8 | 5, 6, 7, 8 |
| 4 |  | 11 | 11, 12 |  |  | 13, 14, 15, 16 |  |
| 5 |  | 9 | 9, 10 |  | 9, 10, 11, 12 | 3, 4 |  |
| 6 |  | 7 | 7, 8 |  |  | 11, 12 |  |
| 7 |  | 13 | 13, 14 |  | 13, 14, 15, 16 |  |  |
| 8 |  | 15 | 15, 16 |  |  |  |  |
| 9 | 2 |  |  |  |  |  |  |
| 10 | 4 |  |  |  |  |  |  |
| 11 |  | 6 |  |  |  |  |  |
| 12 |  | 12 |  |  |  |  |  |
| 13 |  | 10 |  |  |  |  |  |
| 14 |  | 8 |  |  |  |  |  |
| 15 |  | 14 |  |  |  |  |  |
| 16 |  | 16 |  |  |  |  |  |

For example, if the detected midamble k=5 and $K_{CELL}$=8, Burst Type=1, the candidate codes are 9 and 10.

TABLE 3

Channel Response Lengths

| $K_{CELL}$ | $L_r$ |
| --- | --- |
| 3 | 64 |
| 4 | 64 |
| 6 | 32 |
| 8 | 57 |
| 16 | 29 |

Code Energy Measurement

Functional Description

This function is performed only in the MUD configuration. The code energy measurement function measures the energy of the candidate channelization codes by matched filtering the received data with the system matrix to form soft symbols and then measuring the energy of the soft symbols from each of the candidate codes. To reduce processing, only a limited number of symbols are determined. The matched filter is $$\vec{s} = A_{odd}{}^H \vec{r}_{odd} + A_{even}{}^H \vec{r}_{even}$$

The procedure is as follows:

For each of the cclNumCodes candidate codes, determine two vectors, $b_i$, as $\vec{b}_i^{(n)} = \vec{c}^{(cclCode[n])} \otimes \vec{h}_i^{(k)}$, where n is the order of a candidate code within the candidate code list, $\vec{c}^{(cclCode[n])}$ is the spreading code sequence (OVSF code sequence multiplied by scrambling code sequence) of the nth candidate code, from Table 4, $\vec{h}_i^{(k)}$ is the channel response of the midamble shift k associated with the nth code in the candidate code list, where i=1, 2 represent the odd or even channel response, respectively. Channel response length output from Channel Estimation is 114, but only the first 64 are used. The length of $\vec{c}^{(cclCode[n])}$ is always 16 and the length of $\vec{h}_i^{(k)}$ is a function of $K_{CELL}$, the maximum number of midamble shifts, this timeslot, given as $L_r$ in Table 3.

Figure 8:
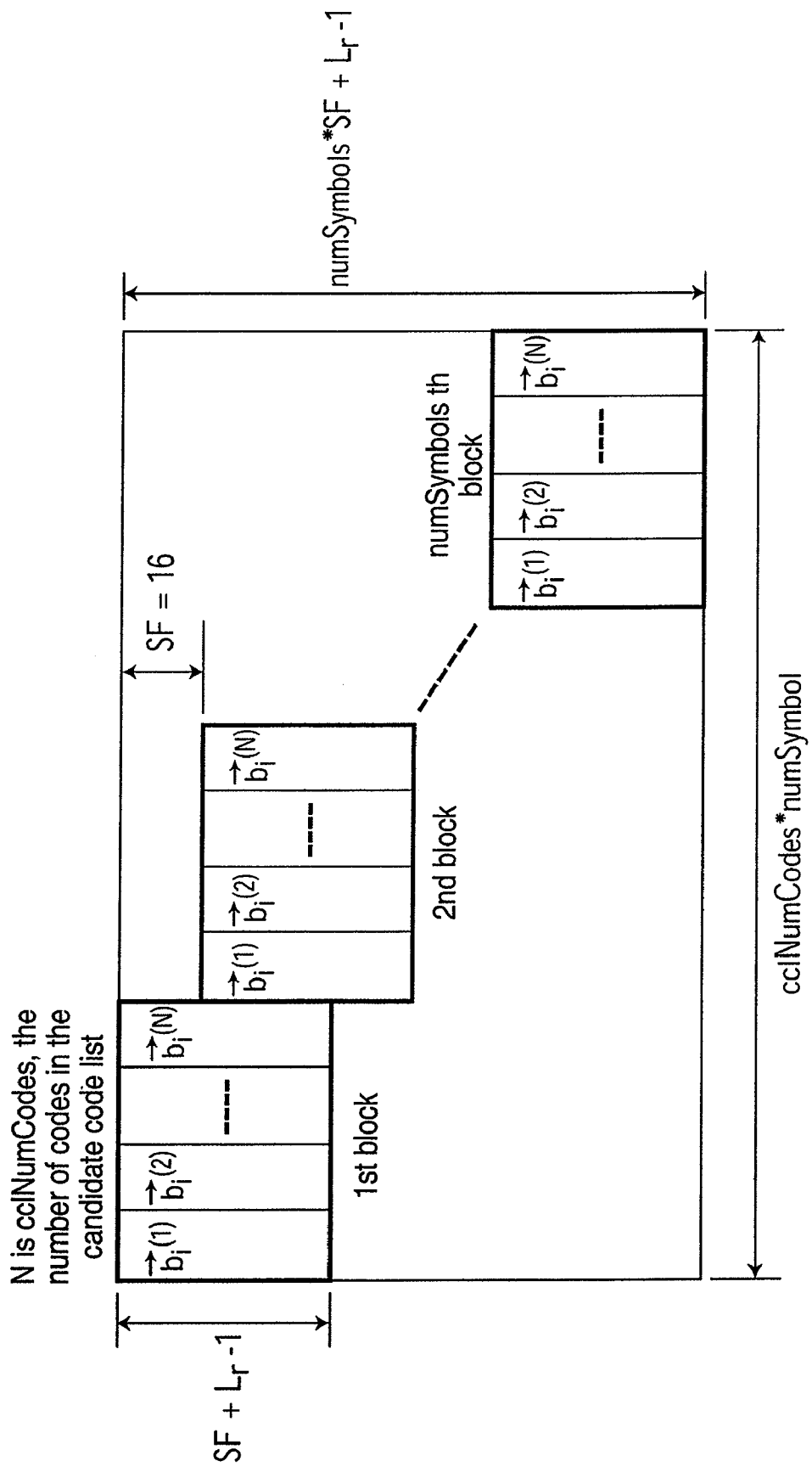
FIG. 8 is a diagram illustrating the construction of the system matrix, $A_i$, in accordance with the preferred embodiment of the present invention.

Form two (odd and even) matrices or blocks of column vectors of vectors $\vec{b}_i^{(n)}$, n=1, ..., cclNumCodes as shown in FIG. 8.

For each of the two system matrices, repeat each of the above described blocks numSymbols times in the descending order as shown in FIG. 8, forming $A_i$, where i={odd, even}.

In beacon timeslots, if midamble shifts k=1 and k=2 were detected (SCTD is on and detected), add together the first two columns of each $A_i$, eliminate the second column and reduce cclNumCodes by one.

Compute the Hermitians of the two system matrices $A_i$, where i={odd, even}, forming $A_i^H$, where i={odd, even}.

Compute the energy of each of the cclNumCodes candidate channelization codes, which for non-beacons is:

$$cclEnergy[n] = \frac{\sum_{m=0}^{numsymbol-1} |s^{(n)}(m)|^2}{\sum_{i=1}^{2} \sum_{m=0}^{L_r-1} |h_i^{(k)}(m)|^2}, \quad n = 1, 2, \ldots, cclNumCodes,$$

where $\vec{h}_i^{(k)}$ is the channel response of the midamble shift k=cclMidList(n) associated with the nth code in the candidate code list and i=1, 2 represent the odd or even channel response, respectively.

In beacon timeslots, if midamble shifts k=1 and k=2 were detected (SCTD is on and detected), compute the energy of the beacon as:

$$cclEnergy[1] = \frac{\sum_{m=0}^{numsymbol-1} |s^{(1)}(m)|^2}{\sum_{i=1}^{2} \sum_{m=0}^{L_r-1} |h_i^{(1)}(m)|^2 + \sum_{i=1}^{2} \sum_{m=0}^{L_r-1} |h_i^{(2)}(m)|^2}$$

TABLE 4

OVSF Code Sequences, SF = 16

| OVSF Code Number | OVSF Code Sequences, SF = 16 | | | | | | | | | | | | | | | |
|---|---|---|---|---|---|---|---|---|---|---|---|---|---|---|---|---|
| 1  | +1 | +1 | +1 | +1 | +1 | +1 | +1 | +1 | +1 | +1 | +1 | +1 | +1 | +1 | +1 | +1 |
| 2  | +1 | +1 | +1 | +1 | +1 | +1 | +1 | +1 | −1 | −1 | −1 | −1 | −1 | −1 | −1 | −1 |
| 3  | +1 | +1 | +1 | +1 | −1 | −1 | −1 | −1 | +1 | +1 | +1 | +1 | −1 | −1 | −1 | −1 |
| 4  | +1 | +1 | +1 | +1 | −1 | −1 | −1 | −1 | −1 | −1 | −1 | −1 | +1 | +1 | +1 | +1 |
| 5  | +1 | +1 | −1 | −1 | +1 | +1 | −1 | −1 | +1 | +1 | −1 | −1 | +1 | −1 | −1 | −1 |
| 6  | +1 | +1 | −1 | −1 | +1 | +1 | −1 | −1 | −1 | −1 | +1 | +1 | −1 | −1 | +1 | +1 |
| 7  | +1 | +1 | −1 | −1 | −1 | −1 | +1 | +1 | +1 | +1 | −1 | −1 | −1 | −1 | +1 | +1 |
| 8  | +1 | +1 | −1 | −1 | −1 | −1 | +1 | +1 | −1 | −1 | +1 | +1 | +1 | +1 | −1 | −1 |
| 9  | +1 | −1 | +1 | −1 | +1 | −1 | +1 | −1 | +1 | −1 | +1 | −1 | +1 | −1 | +1 | −1 |
| 10 | +1 | −1 | +1 | −1 | +1 | −1 | +1 | −1 | −1 | +1 | −1 | +1 | −1 | +1 | −1 | +1 |
| 11 | +1 | −1 | +1 | −1 | −1 | +1 | −1 | +1 | +1 | −1 | +1 | −1 | −1 | +1 | −1 | +1 |
| 12 | +1 | −1 | +1 | −1 | −1 | +1 | −1 | +1 | −1 | +1 | −1 | +1 | +1 | −1 | +1 | −1 |
| 13 | +1 | −1 | −1 | +1 | +1 | −1 | −1 | +1 | +1 | −1 | −1 | +1 | +1 | −1 | −1 | +1 |
| 14 | +1 | −1 | −1 | +1 | +1 | −1 | −1 | +1 | −1 | +1 | +1 | −1 | −1 | +1 | +1 | −1 |
| 15 | +1 | −1 | −1 | +1 | −1 | +1 | +1 | −1 | +1 | −1 | −1 | +1 | −1 | +1 | +1 | −1 |
| 16 | +1 | −1 | −1 | +1 | −1 | +1 | +1 | −1 | −1 | +1 | +1 | −1 | +1 | −1 | −1 | +1 |

Determine $\vec{r}_i$, where i={odd, even}, as the first 16*numSymbols chips of data field D1 in the even and odd received data sequences.

Determine the numSymbols symbols for all candidate codes as $\vec{s} = A_{odd}^H \vec{r}_{odd} + A_{even}^H \vec{r}_{even}$, where $\vec{s}$ is of the form $\vec{s} = [s^{(1)} s^{(2)} \ldots s^{(cclNumCodes)}]^T$, where $s^{(i)} = [s^{(i)}(0) s^{(i)}(1) \ldots s^{(i)}(numSymbol-1)]^T$.

Inputs
Data
oddRxData, odd received data (after midamble cancellation).
evenRxData, even received data (after midamble cancellation).
oddChResp $\vec{h}_o^{(k)}$, k=1, 2, ..., K, odd channel response.
evenChResp $\vec{h}_e^{(k)}$, k=1, 2, ..., K, even channel responses.

cclCode(16), the OVSF channelization code numbers of candidate codes.

Figure 9:
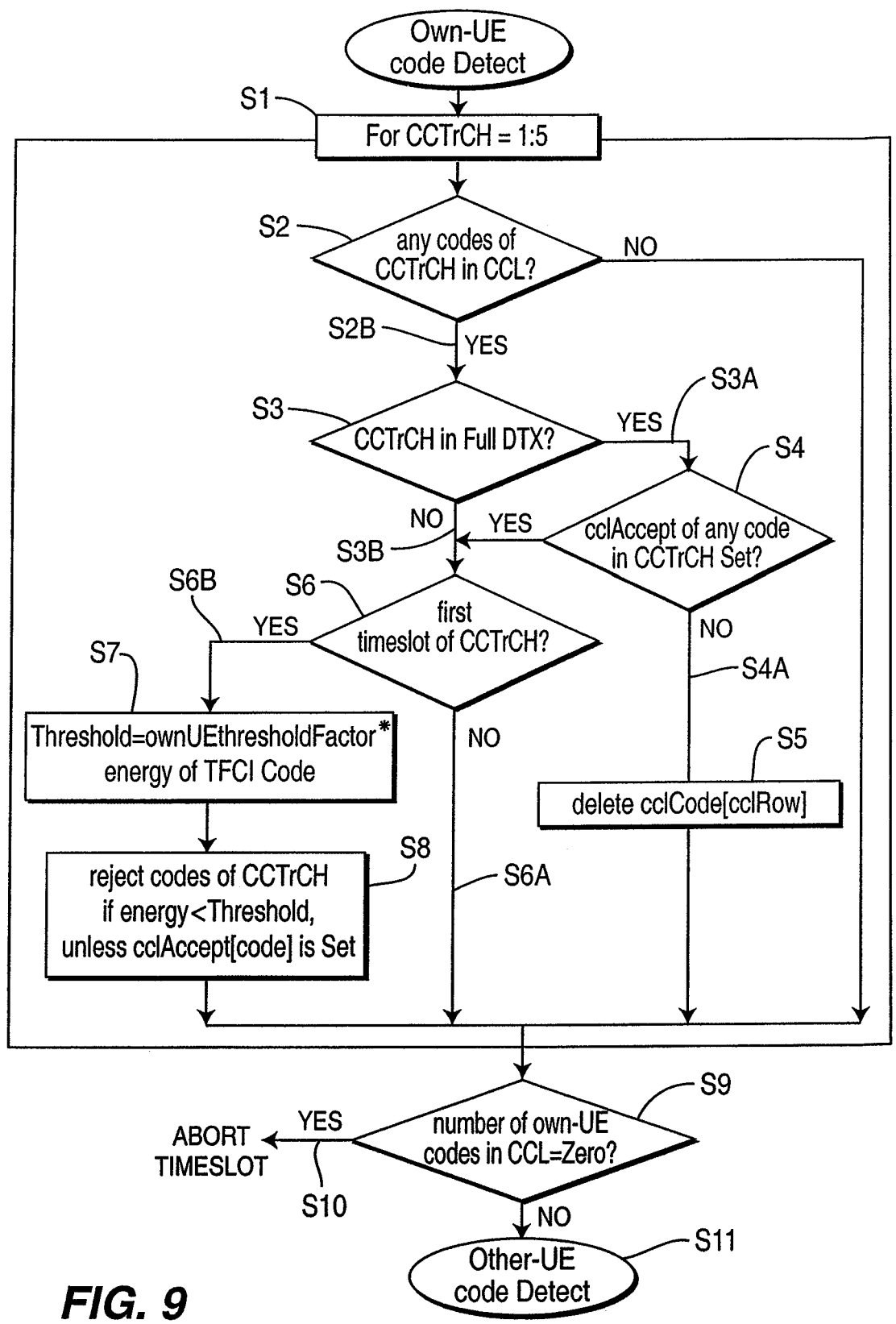
FIG. 9 is a procedure for the own-UE code detect function in accordance with the preferred embodiment of the present invention.

The list of midamble shifts detected by channel estimation function, of the form:
  detMidList(16), the shift number (k value) of detected midambles, 0=no valid entry.
  detMidOffset(16), the channel response offset of detected midambles.
  nDetMid, the number of valid items in detMidList and detMidOffset.
cclSprFactor(16), the spreading factors of the candidate codes.
cclAccept(16), the accept flags of the candidate codes.
Control
$K_{CELL}$, the maximum number of midamble shifts, this timeslot.
burstType, burst type, this time slot.
MUD_SUDindicator, indicates MUD or SUD active in this timeslot.
beaconTSI, Beacon timeslot indicator
Outputs
Data
cclEnergy(16), the energies of the candidate codes.
Frequency of Operation
This function operates every DL timeslot.
Parameters
numSymbols, the number of symbols for estimating code energy, set to 30.
OVSF Codes, SF=16 only (see Table 4).
$L_r$, channel response lengths (see Table 3)
Code Detect
Functional Description This function, shown in FIG. 9, is performed primarily for the MUD configuration. In the SUD configuration, this function simply formats the output for the SUD.

Own-UE Code Detect is followed by Other-UE Code Detect. Own-UE codes and other-UE codes are "rejected" by removing them from the candidate code list. After running Own-UE code detection and other-UE code detection and eliminating excess codes, codes remaining in the candidate code list are output in the Detected Code List. If there are no remaining own-UE codes (or P-CCPCH), an abort signal (S10) is output.

Own-UE Code Detect

Own-UE Code Detect function is shown in FIG. 9.

Step 1 of Own-UE Code Detection is run for each CCTrCH in the candidate code list; some own-UE codes may be rejected.

Step S10 of Own-UE code detect outputs an abort signal, indicating that no further processing of the timeslot is required, if there are no remaining own-UE codes or P-CCPCH in the candidate code list.

Other-UE Code Detect

The Other-UE Code Detect is shown in FIGS. 10A and 10B, the arrangement of FIGS. 10A and 10B being shown in FIG. 10.

Initially, other-UE Code Detection is run (in the MUD configuration only) after own-UE code detection; other-UE codes are detected with a threshold based on the energies of own-UE codes and attributes of the own-UE CCTrCHs (S7 and S8) as shown in FIG. 10A.

Thereafter, other-UE Code Detect rejects other-UE codes if there are more than maxMudCodes codes in the candidate code list. The number of codes is reduced to maxMudCodes by eliminating weaker other-UE codes, at S20.

It should be noted that:

Ma (S3), Mb (S10) and Mc (S12) are local variables that contain the minimum energies computed per the flow chart.

Fa (S4), Fb (S9) and Fc (S13) are local flags that indicate that Ma, Mb and/or Mc, respectively, were computed and contain valid data.

If all three of the above flags are FALSE (S14), which means that there is no firm knowledge that any of the own-UE codes are actually present, the maximum-energy own-UE code is chosen as the reference ("T") for the threshold (S16). Otherwise, the minimum of the minimum energies previously computed (which could be one, two or all three minimums, i.e. Ma and/or Mb and/or Mc) is used as the reference ("T") (S15). Recall that Fx indicates if Mx was computed, where x={a, b, c}.

Inputs
Data
cclCode(16), the OVSF channelization code numbers of candidate codes.
cclMid(16), the midamble shifts of candidate codes.
cclOffset(16), the channel response offset of the candidate codes.
cclSprFactor(16), the spreading factors of the candidate codes.
cclEnergy(16), the energies of the candidate codes.
cclCCTrCH(16), the CCTrCH number of detected code {0=other UE code, 1-4=own-UE or common channel CCTrCH, 5=P-CCPCH}
cclTFCIflag(16), set if code carries the TFCI in its CCTrCH.
tfcCodeListValid(4), set if the received TFCI has been decoded by the fast-TFCI process and tfcCodeList contains valid data, per CCTrCH.
fullDTXindicator(4), set if CCTrCH is in full DTX.
Control
MUD_SUDindicator, indicates MUD or SUD active in this timeslot.
Outputs
Data
The detected code list, of the form:
  chanCode(16), the channelization codes of detected codes, 0=no valid entry.
  sprFactor(16), the spreading factors of detected codes.
  midOffset(16), the channel response offsets of detected codes.
  chanCCTrCH(16), the CCTrCH number of detected code {0=other UE code, 1-4=own-UE or common channel CCTrCH, 5=P-CCPCH}
  chanTFCIflag(16), set if code carries the TFCI in its CCTrCH.
  numCodes, the number of valid items in chanCode, sprFactor, chanCCTrCH, chanTFCIflag and midOffset.
Control
TimeslotAbort, set if no own-UE codes or P-CCPCH to demodulate and thus further processing of the timeslot is required.
This function operates during every DL timeslot.
Parameters
Two thresholds are set
In one example:
ownUEthresholdFactor was set to 0.1.
otherUEthresholdFactor was set to 0.7.
maxMudCodes, the largest number of channelization codes the MUD can support, set to 14.
Other thresholds may be chosen, if desired.

What is claimed is:

1. A method for receiving communications in time frames comprising a plurality of time slots, said time slots having data signals for a plurality of channels, comprising:
   decoding, by a code detector, using a blind cod technique data signals in the timeslots to determine the identity of the plurality of channels when the identity of all channels is not known;
   detecting midambles to provide a set of channelization codes and their associated midambles shifts for a candidate code list;
   generating the candidate code list including identified own-UE candidate codes and other-UE candidate codes from the plurality of channels;
   comparing the identified own-UE and other-UE codes with respective threshold and accepting only those own-UE and other UE-codes that exceed their respective threshold to include in the detected code list;
   wherein some of the identified own-UE and other-UE candidate codes are removed from the candidate code list based on an energy measurement; and
   processing channels in the candidate channel list to thereby demultiplex and decode received data.

2. The method of claim 1 wherein, processing channels in the candidate code list employs a multi-user detection technique.

3. The method of claim 2 wherein, the multi-user detection technique further comprises identifying channelization codes for use in performing signal to interference ratio (SIR) measurements.

4. The method of claim 1 wherein the blind code detection technique comprises providing channelization codes, spreading factors and channel response offsets for use in processing channels in the candidate channel list.

5. The method of claim 2 wherein, the multi-user detection technique comprises measuring code energies.

6. The method of claim 1 wherein the blind code detection technique further comprises:
   identifying own-UE candidate codes and their associated parameters; and
   identifying other-UE candidate codes and their associated parameters.

7. The method of claim 6 wherein, for either a default midamble or a common midamble case, detecting midambles comprises:
   entering only one beacon midamble and one beacon code into the candidate code list with its associated channelization code, channel response offset and spreading factor when a beacon midamble with more than one code and one midamble is detected; and
   setting a flag for a beacon code to prevent the beacon code from being rejected.

8. The method of claim 6 wherein, for a default midamble case, detecting midambles comprises:
   entering a beacon midamble into the candidate code list with its associated channelization code, channel response offset and spreading factor when a first beacon midamble is detected; and
   setting a flag for a first beacon code to prevent the first beacon code from being rejected.

9. The method of claim 8 further comprising:
   entering a beacon midamble into the candidate code list with its associated channelization code, channel response offset and spreading factor when a first beacon midamble is absent and a second beacon midamble is detected; and
   setting a flag for a second beacon code to prevent the second beacon code from being rejected.

10. The method of claim 6 wherein, for a default midamble case, detecting midambles comprises:
    entering a first beacon midamble into the candidate code list with its associated channelization code, channel response offset and spreading factor when a first beacon midamble is detected;
    if midamble detection fails to report a first beacon midamble but reports a second beacon midamble, entering the second beacon midamble into the candidate code list with its associated channelization code, channel response offset and spreading factor when the second beacon midamble is detected; and
    setting a flag to prevent the beacon code for the second beacon midamble from being rejected.

11. The method of claim 6 wherein, for a common midamble case, decoding data signals comprises:
    entering a beacon midamble into the candidate code list with its associated channelization code, channel response offset and spreading factor when a beacon midamble is detected; and
    setting a flag for the beacon code to prevent the beacon code from being rejected during subsequent steps of the method;
    stop processing if a common midamble shift has not been detected; and
    entering into the candidate code list all remaining channelization codes along with a common midamble shift and a given spreading factor.

12. The method of claim 11 wherein for a non-beacon timeslot, stop processing if the common midamble shift has not been detected.

13. The method of claim 1 further comprising:
    searching an own-UE allocation list for each candidate code; and
    for each candidate code found in the own-UE allocation list, adding an associated coded composite transmission channel (CCTrCH) number associated with each own-UE candidate.

14. The method of claim 13 further comprising:
    setting a flag for own-UE transmitted codes which are known from the transport format combination indicator (TFCI) to prevent those codes from being rejected.

15. The method of claim 1 further comprising:
    setting a flag for own-UE transmitted codes which are known from the transport format combination indicator (TFCI) to prevent those codes from being rejected; and
    deleting from the candidate code list all non-transmitted codes.

16. The method of claim 15 further comprising:
    searching an own-UE allocation list identifying candidate codes found in the allocation list as an own-UE candidate; copying CCTrCH numbers of the candidates to the candidate code list; and
    associating a CCTrCH number of zero for those candidates not found in the own-UE allocation list, to indicate that codes in the candidate code list that are not own-UE codes, are other-UE codes.

17. The method of claim 16 further comprising:
    for a received transport format combination indicator (TFCI):
    preventing rejection by code decision of codes known to have been transmitted; and
    removing from the candidate code list codes which have not been transmitted.

18. The method of claim 16 further comprising identifying candidate codes from the candidate list whose associated CCTrCH is zero as other-UE codes.

* * * * *

UNITED STATES PATENT AND TRADEMARK OFFICE
CERTIFICATE OF CORRECTION

| | | |
|---|---|---|
| PATENT NO. | : 7,684,371 B2 | Page 1 of 1 |
| APPLICATION NO. | : 12/426502 | |
| DATED | : March 23, 2010 | |
| INVENTOR(S) | : Haim et al. | |

It is certified that error appears in the above-identified patent and that said Letters Patent is hereby corrected as shown below:

ON THE TITLE PAGE

At Item (75), Inventor: page 1, left column, line 4, after "Ariela" delete "Ziera" and insert therefor --Zeira--.

At Item (56), OTHER PUBLICATIONS, page 2, right column, line 24, before "(TDD)" delete "moducation" and insert therefor --modulation--.

IN THE ABSTRACT

At Item (57), ABSTRACT, page 1, right column, line 6, after the words "with the" delete "identify" and insert therefor --identity--.

IN THE CLAIMS

At claim 1, column 17, line 5, before the word "technique" delete "cod" and insert therefor --code--.

Signed and Sealed this
Twenty-ninth Day of November, 2011

David J. Kappos
*Director of the United States Patent and Trademark Office*